United States Patent
Zhang et al.

(10) Patent No.: US 9,087,253 B2
(45) Date of Patent: Jul. 21, 2015

(54) METHOD AND SYSTEM FOR DETERMINING EDGE LINE IN QR CODE BINARY IMAGE

(71) Applicants: PEKING UNIVERSITY FOUNDER GROUP CO., LTD., Beijing (CN); FOUNDER MOBILE MEDIA TECHNOLOGY (BEIJING) CO., LTD., Beijing (CN)

(72) Inventors: Ling Zhang, Beijing (CN); Chao Guan, Beijing (CN); Zhenhua Liu, Beijing (CN); Gezhang Liu, Beijing (CN); Wanyi Che, Beijing (CN)

(73) Assignees: PEKING UNIVERSITY FOUNDER GROUP CO., LTD., Beijing (CN); FOUNDER MOBILE MEDIA TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/101,947

(22) Filed: Dec. 10, 2013

(65) Prior Publication Data

US 2015/0090793 A1    Apr. 2, 2015

(30) Foreign Application Priority Data

Sep. 29, 2013   (CN) .......................... 2013 1 0454909

(51) Int. Cl.
*G06K 19/00*   (2006.01)
*G06K 7/14*   (2006.01)

(52) U.S. Cl.
CPC ............ *G06K 7/1452* (2013.01); *G06K 7/1417* (2013.01)

(58) Field of Classification Search
USPC .................................. 235/435, 439, 454, 462
See application file for complete search history.

(56) References Cited

U.S. PATENT DOCUMENTS

2006/0082475 A1 *   4/2006   Zhao et al. ...................... 341/50

* cited by examiner

*Primary Examiner* — Matthew Mikels
(74) *Attorney, Agent, or Firm* — Brinks Gilson & Lione

(57) ABSTRACT

Method and system for determining QR code binary image is provided. Locating lines on which edges of the QR code locate are determined according to location information of locating points within the QR code image and distances between the locating points to edges of the QR code. Distances may be used to obtain locating lines on which edges of the QR code locate, with relatively smaller errors. When a QR code image is distorted, it generally bulges outward. The position of a determined locating line is within the interior of the QR code image, and an actual edge of the QR code partly overlaps with the locating line and partly locate on external side of locating line. Edge points on external side of a locating line are detected along the direction of the locating line and then are connected to form an edge line of QR code.

11 Claims, 5 Drawing Sheets

--- determining locating lines on which edges of the QR code locate according to location information of locating points within the QR code image and distances from the locating points to edges of the QR code

↓ detecting edge points on the external side of the locating line along the direction of the locating line, and connecting these edge points to form an edge line of the QR code

```
┌─────────────────────────────────────────────┐
│ determining locating lines on which edges of the QR code │
│ locate according to location information of locating points │
│ within the QR code image and distances from the locating │
│          points to edges of the QR code                   │
└─────────────────────────────────────────────┘
                         │
                         ▼
┌─────────────────────────────────────────────┐
│ detecting edge points on the external side of the locating │
│      line along the direction of the locating line, and    │
│ connecting these edge points to form an edge line of the   │
│                     QR code                                │
└─────────────────────────────────────────────┘
```

Fig. 1

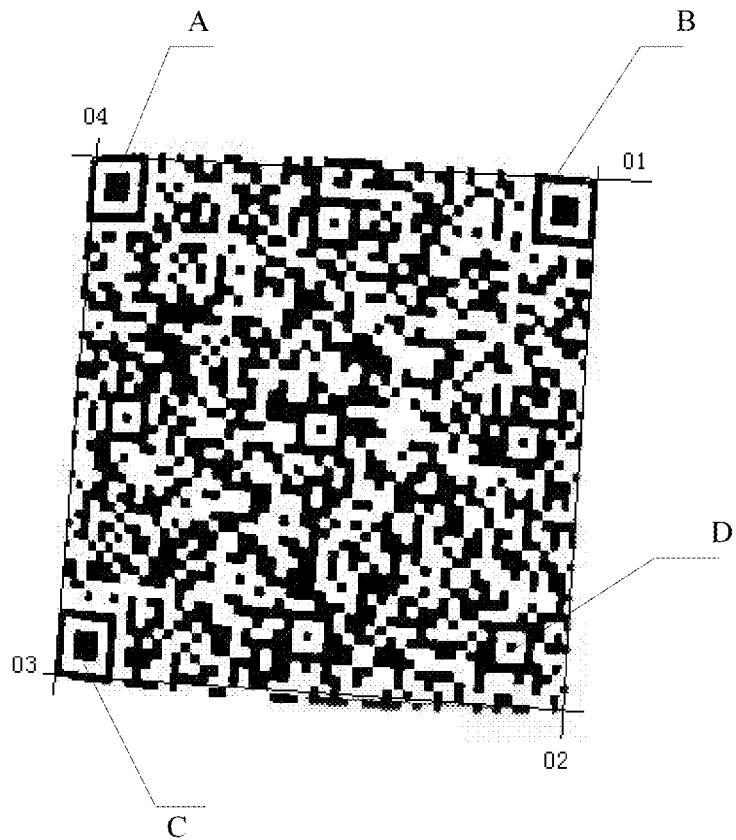

Fig. 2

METHOD AND SYSTEM FOR DETERMINING EDGE LINE IN QR CODE BINARY IMAGE

CROSS-REFERENCE TO RELATED APPLICATIONS

This application claims priority to Chinese Patent Application No. 201310454909.X, filed on Sep. 29, 2013 and entitled "METHOD AND SYSTEM FOR DETERMINING EDGE LINE IN QR CODE BINARY IMAGE", which is incorporated herein by reference in its entirety.

FIELD OF THE INVENTION

The present invention relates to an image processing technique, and more particular, to a method and system for determining edge lines of a QR code binary image.

DESCRIPTION OF THE RELATED ART

QR code, also called as Quick Response Code, is one kind of 2D matrix code symbols. QR code has gained wide applications due to its advantages of high capacity, high intensity, powerful error correcting ability, and high security. The identification of a QR code image generally starts with a binarization process of the QR code image, followed by identifying and decoding the QR code binary image. In the decoding process of a QR code binary image, it is necessary to determine locations of edges of the QR code binary image. If the QR code image is a planar image, the location of its edges may be determined easily. However, in practice, QR codes are commonly attached to non-planar objects, such as bottles. A QR code image shot in this way may have severe distortions therein, along with impacts of environment noises and interference during the binarization, the obtained QR code binary image may have a poor edge sharpness, which may disturb the determination of edges of the QR code.

QR code edge locations are determined in the prior art using some specific mathematical algorithms, in which boundary lines between a QR code image and a background are extracted to obtain the profile of the QR code image. In regular methods, edge location determination operators, such as the Sobel operator, the Prewitt operator, the Roberts operator, are constructed in a small neighbourhood of pixels in an original image to determine locations of edges of the QR code. No matter for which algorithm above, there is a high smoothness requirement for edges of the QR code. For QR codes with severe distortions, such as those on bottles, the above algorithms may only determine edges with poor accuracy.

SUMMARY OF THE INVENTION

Thus, a method and system for determining edge lines of a QR code binary image is provided in this invention to solve the problem in the prior art of unable to determine locations of edges of a QR code under various complex situations in a simple and accurate manner.

In order to solve the above problems, this invention is implemented in the following technical solutions.

A method for determining edge lines of a QR code binary image, characterized in comprising the following steps:
 obtaining locating lines: determining locating lines on which edges of the QR code locate according to location information of locating points within the QR code image and distances from the locating points to edges of the QR code;
 obtaining edge lines: detecting edge points on the external side of the locating line along the direction of the locating line, and connecting these edge points to form an edge line of the QR code.

Further, the method comprises the following steps:
 dividing the image into blocks: dividing the QR code binary image into blocks, selecting blocks including edges of the QR code as boundary blocks, each boundary block including at least two locating points which have fixed distances to edges of the QR code;
 in the step of obtaining locating lines, determining a locating line in the boundary block where an edge of the QR code locates, according to location information of each locating point in a boundary block and distances from the locating point to edges of the QR code;
 in the step of obtaining edge lines, detecting edge points on the external side of the locating line along the direction of a locating line, connecting these edge points to form an edge line of boundary block, and connecting the edge lines of each boundary block to obtain an edge line of the QR code.

Further, in the step of dividing the image into blocks, the boundary block is a rectangle, and each boundary block includes four locating points having fixed distances to edges of the QR code.

Further, in the step of dividing the image into blocks, the central points of detection patterns and/or correction patterns are selected as locating points in a boundary block.

Further, the step of obtaining edge lines comprises:
 obtaining pixels: obtaining all pixels adjacent to a locating line;
 obtaining a detection line: for each pixel, obtaining a detection line passing through the pixel and perpendicular to the locating line, the detection line extending to the external side of the locating line;
 obtaining edge points: detecting grayscale values of pixels on the external side of the locating line along the direction of the detection line, until a white pixel is detected, and taking the last black pixel that is detected as an edge point on the detection line.

Further, in the step of obtaining edge points, if there is no black pixel on the detection line, finding out two black pixels adjacent to the detection line, obtaining an average value of distances from the two black pixels to the locating line as the distance between an edge point on the detection line to the locating line.

Further, in the step of obtaining edge points, if there is no black pixel on the detection line and there is only one black pixel adjacent to the detection line, obtaining the distance from the black pixel to the locating line as the distance between an edge point on the detection line to the locating line.

A system for determining edge lines of a QR code binary image, characterized in comprising:
 a locating line obtaining unit, for determining locating lines on which edges of the QR code locate according to location information of locating points within the QR code image and distances from the locating points to edges of the QR code;
 an edge line obtaining unit, for detecting edge points on the external side of the locating line along the direction of the locating line, and connecting these edge points to form an edge line of the QR code.

Further, the system comprises:
 an image dividing unit, for dividing the QR code binary image into blocks, selecting blocks including edges of the QR code as boundary blocks, each boundary block including at least two locating points which have fixed distances to edges of the QR code;

wherein, in the locating line obtaining unit, determining a locating line in the boundary block where an edge of the QR code locates, according to location information of each locating point in a boundary block and distances from the locating point to edges of the QR code;

in the edge line obtaining unit, detecting edge points on the external side of the locating line along the direction of a locating line, connecting these edge points to form an edge line of boundary block, and connecting the edge lines of each boundary block to obtain an edge line of the QR code.

Further, in the image dividing unit, the boundary block is a rectangle, and each boundary block includes four locating points.

Further, in the image dividing unit, the central points of detection patterns and/or correction patterns are selected as locating points in a boundary block.

Further, the edge line obtaining unit comprises:

a pixel obtaining module, for obtaining all pixels adjacent to a locating line;

a detection line obtaining module, for each pixel, obtaining a detection line passing through the pixel and perpendicular to the locating line, the detection line extending to the external side of the locating line;

an edge point obtaining module, for detecting grayscale values of pixels on the external side of the locating line along the direction of the detection line, until a white pixel is detected, and taking the last black pixel that is detected as an edge point on the detection line.

Further, the edge point obtaining module is further configured to, if there is no black pixel on the detection line, find out two black pixels adjacent to the detection line, obtain an average value of distances from the two black pixels to the locating line as the distance between an edge point on the detection line to the locating line.

Further, the edge point obtaining module is further configured to, if there is no black pixel on the detection line and there is only one black pixel adjacent to the detection line, obtain the distance from the black pixel to the locating line as the distance between an edge point on the detection line to the locating line.

The technical solutions of this invention have the following advantages over the prior art:

(1) In the method and system for determining edge lines of a QR code binary image of this invention, locating lines on which edges of the QR code locate are determined according to location information of locating points within the QR code image and distances from the locating points to edges of the QR code. Because distances from those locating points to edges of the QR code are known, even for a distorted QR code image, distances from those locating points to edges of the QR code do not change or change in very small magnitude. Thus, these distances may be used to obtain locating lines on which edges of the QR code locate, with relatively smaller errors. When a QR code image is distorted, it generally bulges outward. Thus, the position of a determined locating line is within the QR code image, and an actual edge of the QR code should partly overlap with the locating line and partly locate outside the locating line. Thus, edge points outside a locating line are detected along the direction of the locating line and then are connected to form an edge line of the QR code. Edge lines determined as such have smaller errors, with a very small amount of computation in the complete process, enabling fast edge detection of the QR code.

(2) In the method and system for determining edge lines of a QR code binary image of this invention, through dividing the QR code binary image into blocks according to an image dividing method, an edge line is determined for each boundary block and the edge lines of the boundary blocks are connected to obtain an edge line of the entire binary image. After the dividing process, the area of each boundary block is smaller with respect to the entire binary image, causing smaller errors in obtaining locating lines of the boundary blocks according to distances from locating points to the edges, which may further improve the accuracy of the determined edge lines.

(3) In the method and system for determining edge lines of a QR code binary image of this invention, the boundary block is a rectangle, and each boundary block includes four locating points having fixed distances to edges of the QR code. If the boundary block is a rectangle, it may include one, two or three edge lines, in which case locating lines where edge lines locate may be determined according to known distances from the four locating points to each edge line. That is, when a boundary block includes four locating points, an edge line in the rectangular boundary block may be obtained accurately.

(4) In the method and system for determining edge lines of a QR code binary image of this invention, central points of detection patterns and/or correction patterns are selected as the locating points in the boundary block. Because in a QR code image, locations of detection patterns and correction patterns are known, and distances from detection patterns and correction patterns to edge lines are also known, selecting central points of detection patterns and correction patterns as the locating points may make the detection of edge lines more convenient and faster, and may further improve the efficiency of determining edge lines.

(5) In the method and system for determining edge lines of a QR code binary image of this invention, after locating lines are obtained, for each pixel around a locating line, a detection line passing through the pixel and perpendicular to the locating line is obtained, wherein the detection line extends to the external side of the locating line. Along the direction of the detection line, grayscale values of pixels on the external side of the locating line are detected until a white pixel is reached, and the last black pixel that is detected is taken as an edge point on the detection line. Because a QR code image generally bulges outward when it is distorted, and edge points are generally near the locating lines, when a white pixel is detected on the detection line, it may be substantially determined that the last detected black pixel is an actual edge point. This decision method is simple, with no need for complex algorithms and steps, and with higher detection efficiency and an accurate detection result.

(6) In the method and system for determining edge lines of a QR code binary image of this invention, it is also considered that the edge point may be a white pixel and no black pixel may be detected on the detection line. Because two black pixels adjacent to the detection line have been determined, however, the white pixel serving as an edge point should locate on a line connected between the two black pixels. Thus, an average value of distances from the two black pixels to the locating line is obtained and is used as the distance from the edge point on the detection line to the locating line. Thereby, white pixel edges may not be ignored when edge lines are determined, and the accuracy of the edge line determination may be improved, making the edge lines smoother.

(7) In the method and system for determining edge lines of a QR code binary image of this invention, a situation where an edge point near a corner of the binary image is a white pixel is also considered. In this situation, no black pixel may be detected on the detection line and there is only one black pixel adjacent the detection line. Thus, it may be approximately considered that the distance from the white pixel to the locating line is equal to the distance from the adjacent black pixel to the locating line. With this method, a situation may be prevented in which white regions near corners are ignored, with the ensured smoothness of edge lines that are finally obtained.

BRIEF DESCRIPTION OF THE DRAWINGS

For a clear understanding of the content of this invention, this invention will be further described according to particular embodiments in reference to drawings.

FIG. 1 is a flowchart of a method for determining edge lines of a QR code binary image according to one embodiment;

FIG. 2 is a binary image of a QR code;

DESCRIPTION OF THE EMBODIMENTS

Embodiment 1

Figure 3:
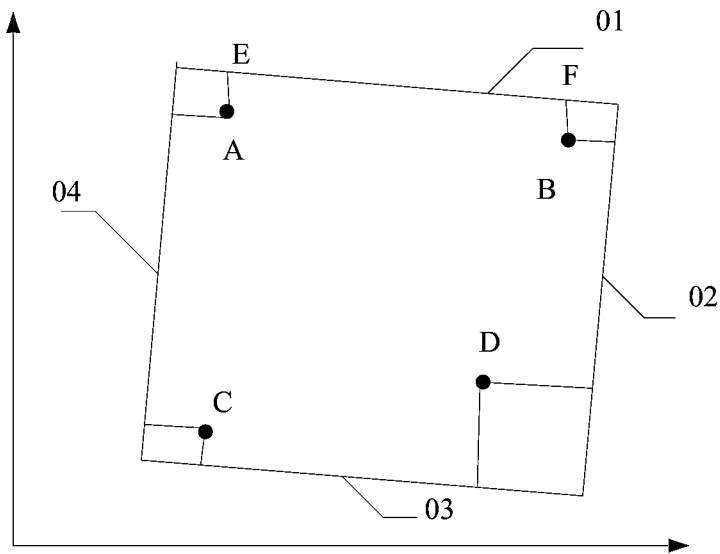
FIG. 3 is a schematic diagram of the binary image shown in FIG. 2 in a coordinate system.

A method for determining edge lines of a QR code binary image is provided in this embodiment, which as shown in FIG. 1 comprises the following steps:

obtaining locating lines: determining locating lines on which edges of the QR code locate according to location information of locating points within the QR code image and distances from the locating points to edges of the QR code;

obtaining edge lines: detecting edge points on the external side of the locating line along the direction of the locating line, and connecting these edge points to form an edge line of the QR code.

Location information of locating points may be coordinate values in a coordinate system of those locating points in the QR code image, or may be relative locations of those locating points in the QR code image. For example, when a locating point is a pixel, the locations in the horizontal and vertical directions of a module in which the locating point locates may be obtained, and then relative locations of the locating point in the module may be further obtained, which is the location information of the locating point.

As shown in FIG. 2, for a QR code binary image, first detection pattern A, second detection pattern B, third detection pattern C and correction pattern D on the lower right corner in the image are selected as locating points. As shown in FIG. 2, first detection pattern A locates on the upper left corner of the QR code image, second detection pattern B locates on the upper right corner of the QR code image, and third detection pattern C locates on the lower left corner of the QR code image. For the QR code image, the detection patterns and the correction pattern on the lower right corner have fixed distances to edges of the QR code. Because each detection pattern has an outermost black square with 7*7 modules, an inner white square with 5*5 module, and an innermost black square with 3*3 modules, distances from each module or pixel in a detection pattern to edges of the QR code are known. Similarly, each correction pattern has an outermost black square with 5*5 modules, an inner white square with 3*3 modules, and an innermost black square with one module, relative locations between various correction patterns and relative locations between correction patterns and detection patterns and relative locations between correction patterns and edges of the QR code also have fixed values. For example, the distance in the vertical direction between the central point of lower right correction pattern D and the central point of third detection pattern C on the lower left corner is three modules; similarly, the distance in the horizontal direction between the central point of lower right correction pattern D and the central point of second detection pattern B on the upper right corner is three modules. In a QR code binary image, the distance from each pixel to the edges may be obtained in advance, thus in theory, each pixel may be used as a locating point.

The central points of first detection pattern A, second detection pattern B, third detection pattern C, and correction pattern D as selected as locating points in this embodiment. This selection is easier to understand and is more convenient for obtaining location information of these four points. As to the binary image shown in FIG. 2, given that it is in a coordinate system and coordinates of the above four locating points are $(X_A, Y_A)$, $(X_B, Y_B)$, $(X_C, Y_C)$, and $(X_D, Y_D)$ respectively, the above coordinates may be obtained through detecting locations of the above detection patterns in the coordinate system. Also given that the distances from the central point of first detection pattern A to the upper edge and the left edge are both 3 modules, the distances from the central point of second detection pattern B to the upper edge and the right edge are both 3 modules, the distances from the central point of correction pattern D to the left edge and the lower edge are both 6 modules.

Along the horizontal and vertical directions, as shown in FIG. 3, points having distances to the above locating points that meet a condition are obtained. A point having a distance of 3 modules to the central point of first detection pattern A in the vertical direction is point E, a point having a distance of 3 modules to the central point of second detection pattern B in the vertical direction is point F, wherein the coordinates of point E are $(X_A, Y_A+3)$, and the coordinates of point F are $(X_B, Y_B+3)$. Because $(X_A, Y_A)$ and $(X_B, Y_B)$ are known, the coordinates of points E and F are also known. Because a line may be determined by two points, an equation of locating line 01 where the upper edge locates may be determined according to points E and F. equations of other three locating lines may be obtained with a similar method.

It can be seen from FIG. 3, locating line 02 and locating line 04 are substantially edges of the binary image. Locating line 01 and locating line 03 are within the QR code image, and there are still pixels of the binary image that are on the external side of each of these two locating line.

For the four locating line, it is detected whether there are edge points on the external side of the fourth locating line, which may be realized through detecting black pixels. After all the black pixels are detected, they are connected to form a line, i.e., an actual edge line of the QR code binary image.

In the method for determining QR code binary image of this embodiment, locating lines on which edges of the QR code locate are determined according to location information of locating points within the QR code image and distances from the locating points to edges of the QR code. Because distances from those locating points to edges of the QR code are known, even for a distorted QR code image, distances from those locating points to edges of the QR code do not change or have very small changes. Thus, these distances may be used to obtain locating lines on which edges of the QR code locate, with relatively smaller errors. When a QR code image is distorted, it generally bulges outward. Thus, the position of a determined locating line is within the QR code image, and an actual edge of the QR code should partly overlap with the locating line and partly locate on the external side of the locating line. Thus, edge points on the external side of a locating line are detected along the direction of the locating line and then are connected to form an edge line of the QR code. Edge lines determined as such have smaller errors, with a very small amount of computation in the complete process, enabling fast edge detection of the QR code.

Embodiment 2

Figure 4:
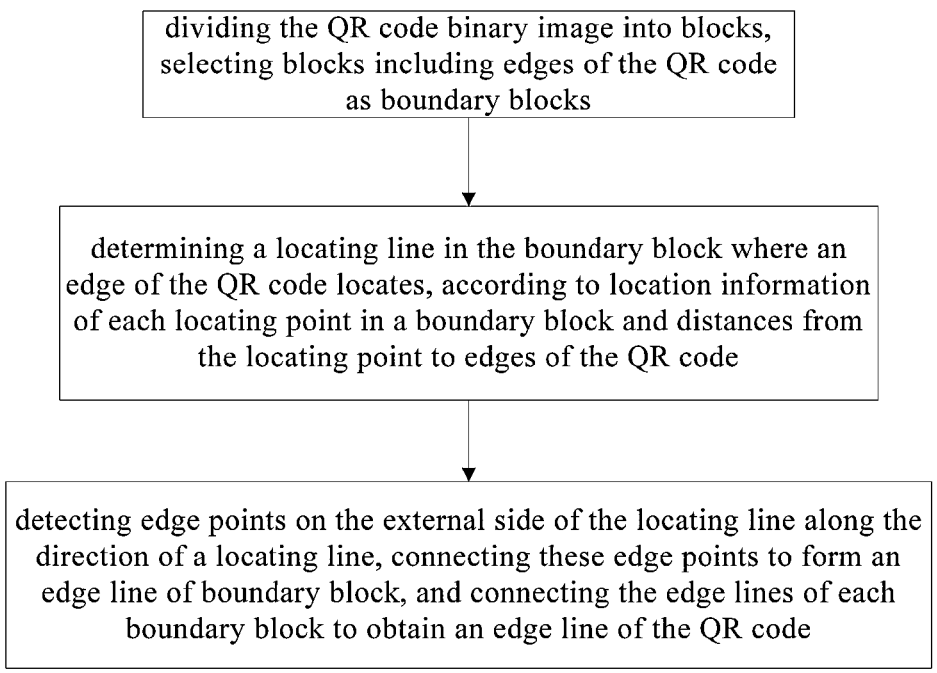
FIG. 4 is a flowchart of a method for determining edge lines of a QR code binary image according to one embodiment.

A method for determining edge lines of a QR code binary image is provided in this embodiment, which as shown in FIG. 4 further comprises the following steps on the basis of embodiment 1:

dividing the image into blocks: dividing the QR code binary image into blocks, selecting blocks including edges of the QR code as boundary blocks, each boundary block including at least two locating points which have fixed distances to edges of the QR code;

in the step of obtaining locating lines, determining a locating line in the boundary block where an edge of the QR code locates, according to location information of each locating point in a boundary block and distances from the locating point to edges of the QR code;

in the step of obtaining edge lines, detecting edge points on the external side of the locating line along the direction of a locating line, connecting these edge points to form an edge line of boundary block, and connecting the edge lines of each boundary block to obtain an edge line of the QR code.

Figure 5:
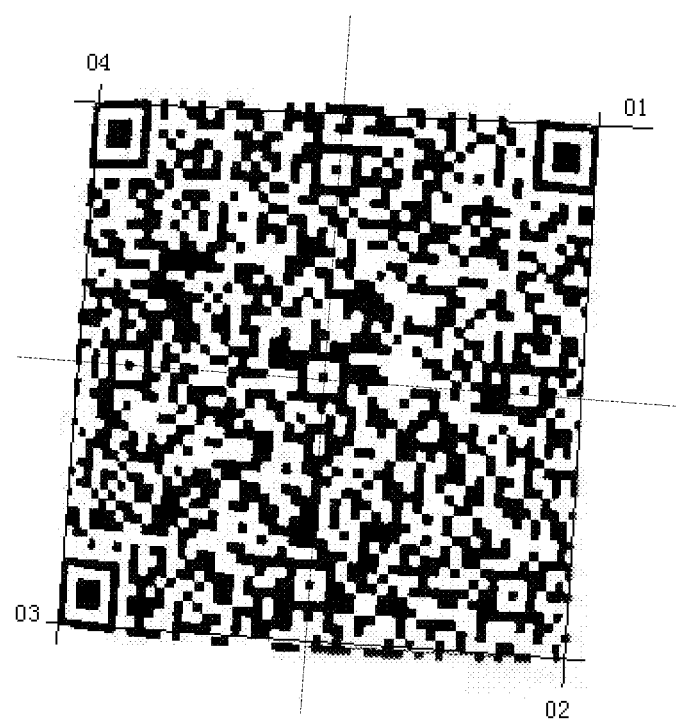
FIG. 5 is a schematic diagram of a binary image divided into blocks according to one embodiment.

The dividing process in this embodiment comprises dividing a binary image into at least two blocks. For the dividing operation, the image may be equally divided into two, four, six or even eight blocks. As shown in FIG. 5, a method of dividing the image into four blocks is given.

It can be seen from this figure, each block is a boundary block, and each boundary block comprises two edge lines. After each edge line is obtained, edge lines on the same side of the binary image are connected to form an edge line of the QR code. For example, as to a boundary block on the upper left corner, its edge lines are on the left and upper sides of the image, thus, the left edge line is definitely on the left of the QR code, and the upper edge line is on the upper side of QR code. Similarly, the upper edge line of the upper right block is definitely on the upper side of the QR code, and those upper edge lines are connected to form an upper edge line of the QR code. And so on, edge lines on four sides of the QR code may be obtained.

In the method for determining QR code binary image of this invention, through dividing the QR code binary image into blocks according to an image dividing method, an edge line is determined for each boundary block and the edge lines of the boundary blocks are connected to obtain an edge line of the entire binary image. Through the dividing process, the area of each boundary block is smaller than the entire binary image, causing smaller errors in locating lines of the boundary blocks obtained according to distances from locating points to edges of the QR code image, which may further improve the accuracy of the determined edge lines.

In this embodiment, preferably, in the image dividing step, the boundary block is a rectangle, and each boundary block has four locating points having fixed distances to edges of the QR code. If the boundary block is a rectangle, it may include one, two or three edge lines, in which case locating lines where edge lines locate may be determined according to known distances from the four locating points to each edge line. That is, when a boundary block includes four locating points, an edge line in the boundary block may be obtained accurately.

More preferably, in the image dividing step, central points of detection patterns and/or correction patterns are selected as the locating points in the boundary block. Because in a QR code image, locations of detection patterns and correction patterns and distances from detection patterns and correction patterns to edge lines are known, selecting central points of detection patterns and correction patterns as the locating points may make the detection of edge lines more convenient and faster, and may further improve the efficiency of determining edge lines.

Embodiment 3

The following improvements are made on the basis of embodiment 1 or embodiment 2 in this embodiment, wherein the step of obtaining edge lines comprises:

obtaining pixels: obtaining all pixels adjacent to a locating line;

obtaining a detection line: for each pixel, obtaining a detection line passing through the pixel and perpendicular to the locating line, the detection line extending to the external side of the locating line;

obtaining edge points: detecting grayscale values of pixels on the external side of the locating line along the direction of the detection line, until a white pixel is detected, and taking the last black pixel that is detected as an edge point on the detection line.

Because a QR code image generally bulges outward when it is distorted, and edge points are generally near to locating lines, when a white pixel is detected on the detection line, it may be substantially determined that a last black pixel that is detected previously is an actual edge point. This decision method is simple, with no need for complex algorithms and steps, and with higher detection efficiency and an accurate detection result.

Figure 6:
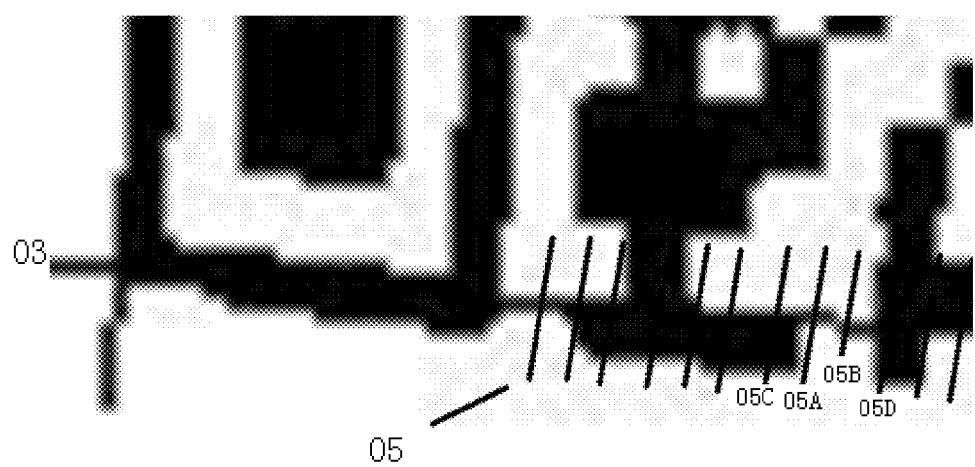
FIG. 6 is a schematic enlarged diagram of the lower left portion of the binary image shown in FIG. 5.

In this embodiment, preferably, in the step of obtaining edge points, if there is not a black pixel on the detection line, two black pixels adjacent to the detection line are found, and an average value of the distances from these two black pixels to the locating line is obtained and used as the distance between an edge point on the detection line and the locating line. FIG. 6 is a schematic enlarged diagram of the lower left portion of the binary image shown in FIG. 5. It can be seen from this figure that detection line 05 is a line perpendicular to locating line 03. It can be seen from this figure that there are no black pixels, which are on the external side of locating line 03, on two detection lines 05A and 05B. Thus, black pixels detected on their two adjacent detection lines are obtained, i.e., black pixels on two detection lines 05D and 05D. An average value of the distances from these two black pixels to the locating line is obtained and used as the distance between an edge point on the detection line and the locating line.

In this way, a situation in which the edge point may be a white pixel and no black pixel may be detected on the detection line is considered. Because two black pixels adjacent to the detection line have been determined however, the white pixel serving as an edge point should locate on a line connected between the two black pixels. Thus, an average value of distances from the two black pixels to the locating line is obtained and is used as the distance from the edge point on the detection line to the locating line. Thereby, white pixel edges may not be ignored when edge lines are determined, and the accuracy of the determined edge lines may be improved, making the edge lines smoother.

More preferably, in the step of obtaining edge points, if there is not a black pixel on the detection line and there is only one black pixel adjacent to the detection line, the distance from the black pixel to the locating line is obtained and used as the distance between an edge point on the detection line and the locating line. This method considers a situation of an edge point near a corner of the binary image which is a white pixel. At that point, no black pixel may be detected on the detection line and there is only one black pixel adjacent to the detection line. Thus, it may be approximately considered that the distance from the white pixel to the locating line is equal to the distance from the adjacent black pixel to the locating line. With this method, a situation may be prevented in which white regions near corners are ignored, with the ensured smoothness of edge lines that are finally obtained.

Embodiment 4

Figure 7:
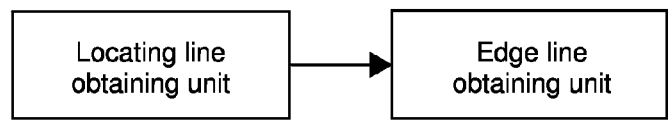
FIG. 7 is a principle block diagram of a system for determining edge lines of a QR code binary image according to one embodiment.

A system for determining edge lines of a QR code binary image is provided in this embodiment, which as shown in FIG. 7 comprises: a locating line obtaining unit, for determining locating lines on which edges of the QR code locate according to location information of locating points within the QR code image and distances from the locating points to edges of the QR code; an edge line obtaining unit, for detecting edge points on the external side of the locating line along the direction of the locating line, and connecting these edge points to form an edge line of the QR code.

In the system of this embodiment, locating lines on which edges of the QR code locate are determined according to location information of locating points within the QR code image and distances between the locating points to edges of the QR code. Because distances from those locating points to edges of the QR code are known, even for a distorted QR code image, distances from those locating points to edges of the QR code do not change or change in very small magnitude. Thus, these distances may be used to obtain locating lines on which edges of the QR code locate, with relatively smaller errors. When a QR code image is distorted, it generally bulges outward. Thus, the position of a determined locating line is within the interior of the QR code image, and an actual edge of the QR code should partly overlap with the locating line and partly locate on the external side of the locating line. Thus, edge points on the external side of a locating line are detected along the direction of the locating line and then are connected to form an edge line of the QR code. edge lines determined as such have smaller errors, with a very small amount of computation in the complete process, enabling fast edge detection of the QR code.

Embodiment 5

Figure 8:
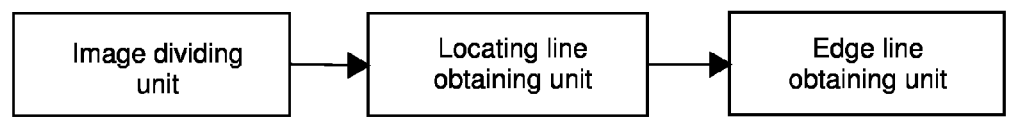
FIG. 8 is a principle block diagram of a system for determining edge lines of a QR code binary image according to one embodiment.

A system for determining edge lines of a QR code binary image is provided in this embodiment, as shown in FIG. 8, on the basis of embodiment 4, which further comprises:

an image dividing unit, for dividing the QR code binary image into blocks, selecting blocks including edges of the QR code as boundary blocks, each boundary block including at least two locating points which have fixed distances to edges of the QR code;

wherein, in the locating line obtaining unit, determining a locating line in the boundary block where an edge of the QR code locates, according to location information of each locating point in a boundary block and distances from the locating point to edges of the QR code;

in the edge line obtaining unit, detecting edge points on the external side of the locating line along the direction of a locating line, connecting these edge points to form an edge line of boundary block, and connecting the edge lines of each boundary block to obtain an edge line of the QR code.

In the system for determining QR code binary image of this embodiment, through dividing the QR code binary image into blocks according to an image dividing method, an edge line is determined for each boundary block and the edge lines of the boundary blocks are connected to obtain an edge line of the entire binary image. Through the dividing process, the size of each boundary block is smaller than the entire binary image, causing smaller errors in locating lines of the boundary blocks obtained according to distances from locating points to edges of the QR code image, which may further improve the accuracy of the determined edge lines.

In this embodiment, preferably, in the image dividing unit, the boundary block is a rectangle, and each boundary block has four locating points. When the boundary block is a rectangle, it may include one, two or three edge lines, in which case locating lines where edge lines locate may be determined according to known distances from the four locating points to each edge line. That is, when a boundary block includes four locating points, an edge line in the boundary block may be obtained accurately.

More preferably, in the image dividing unit, the central points of detection patterns and/or correction patterns are selected as locating points in a boundary block. Because in a QR code image, locations of detection patterns and correction patterns and distances from detection patterns and correction patterns to edge lines are known, selecting central points of detection patterns and correction patterns as the locating points may make the detection of edge lines more convenient and faster, and may further improve the efficiency of determining edge lines.

Embodiment 6

Figure 9:
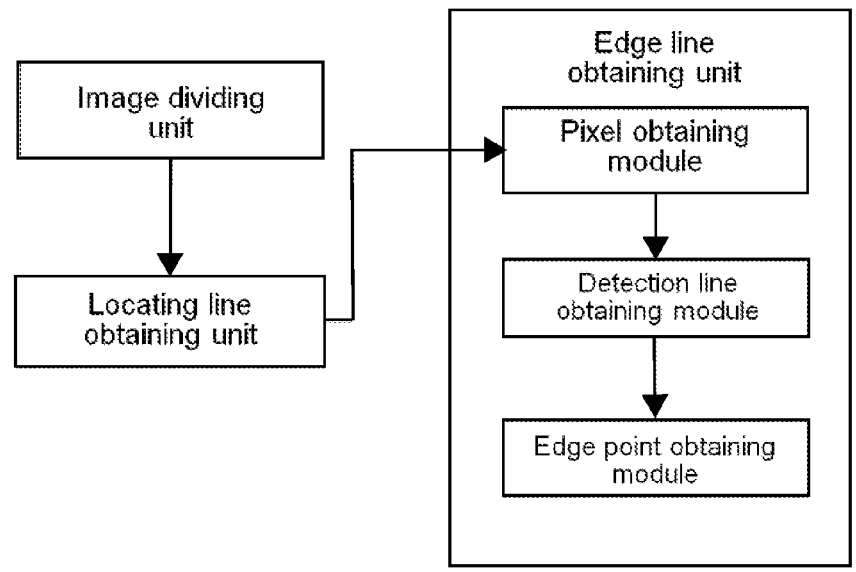
FIG. 9 is a principle block diagram of a system for determining edge lines of a QR code binary image according to one embodiment.

The following improvements are made on the basis of embodiment 4 or embodiment 5 in this embodiment, wherein as shown in FIG. 9, the edge line obtaining unit comprises:

a pixel obtaining module, for obtaining all pixels adjacent to a locating line;

a detection line obtaining module, for each pixel, obtaining a detection line passing through the pixel and perpendicular to the locating line, the detection line extending to the external side of the locating line;

an edge point obtaining module, for detecting grayscale values of pixels on the external side of the locating line along the direction of the detection line, until a white pixel is detected, and taking the last black pixel that is detected as an edge point on the detection line.

Because a QR code image generally bulges outward when it is distorted, and edge points are generally near to locating lines, when a white pixel is detected on the detection line, it may be substantially determined that a last black pixel that is detected previously is an actual edge point. This decision method is simple, with no need for complex algorithms and steps, and with higher detection efficiency and an accurate detection result.

In this embodiment, preferably, the edge point obtaining module is further used to, when there is not a black pixel on the detection line, find out two black pixels adjacent to the detection line are found, obtain an average value of distances from the two black pixels to the locating line as the distance between an edge point on the detection line to the locating line. It is also considered is this method that the edge point may be a white pixel and no black pixel may be detected on the detection line. Because two black pixels adjacent to the detection line have been determined however, the white pixel serving as an edge point should locate on a line connected between the two black pixels. Thus, an average value of distances from the two black pixels to the locating line is obtained and is used as the distance from the edge point on the detection line to the locating line. Thereby, white pixel edges may not be ignored when edge lines are determined, and the accuracy of the determined edge lines may be improved, making the edge lines smoother.

More preferably, the edge point obtaining module is further used to, when there is not a black pixel on the detection line and there is only one black pixel adjacent to the detection line, obtain the distance from the black pixel to the locating line as the distance between an edge point on the detection line to the locating line. A situation of an edge point near a corner of the binary image which is a white pixel is also considered. At that point, no black pixel may be detected on the detection line and there is only one black pixel adjacent to the detection line. Thus, it may be approximately considered that the distance from the white pixel to the locating line is equal to the distance from the adjacent black pixel to the locating line. With this method, a situation may be prevented in which white regions near corners are ignored, with the ensured smoothness of edge lines that are finally obtained.

A person skilled in the art should appreciate that the examples of the present application may be provided as method, system, or a computer program product. Therefore, the present application may take the form of completely hardware examples, completely software examples, or hardware and software combined examples. Moreover, the present application may adopt the form of a computer program product implemented on one or more computer readable storage medium (including but not limited to a disk storage, a CD-ROM, an optical disk, etc) containing computer usable program codes.

The present application is described with reference to the flowcharts and/or block diagrams of the method, apparatus (system) and computer program product of the examples of the present invention. It should be understood that a computer program instruction is used to implement each flow and/or block in the flowcharts and/or block diagrams, and combination of flows/blocks in the flowcharts and/or block diagrams. These computer program instructions may be provided to a universal computer, a special computer, an embedded processor or processors of other programmable data processing devices to generate a machine such that an apparatus for implementing the functions specified in one or more flow in the flowcharts and/or one or more blocks in the block diagrams is generated through the instructions executed by the computer or the processor of other programmable data processing devices.

These computer program instructions may also be stored in a computer readable memory that can direct the computer or other programmable data processing devices to work in a particular manner such that the instruction stored in the computer readable memory generates a product including an instruction apparatus, which implements the functions specified in one or more flows in the flowchart and/or one or more blocks in the block diagram.

These computer program instructions may also be loaded in a computer or other programmable data processing devices such that a series of operation steps are executed on the computer or other programmable data processing devices to generate computer implemented processing, and thus the instruction executed on the computer or other programmable data processing devices provides the steps for implementing the functions specified in one or more flows in the flowchart and/or one or more blocks in the block diagram.

Figure 10:
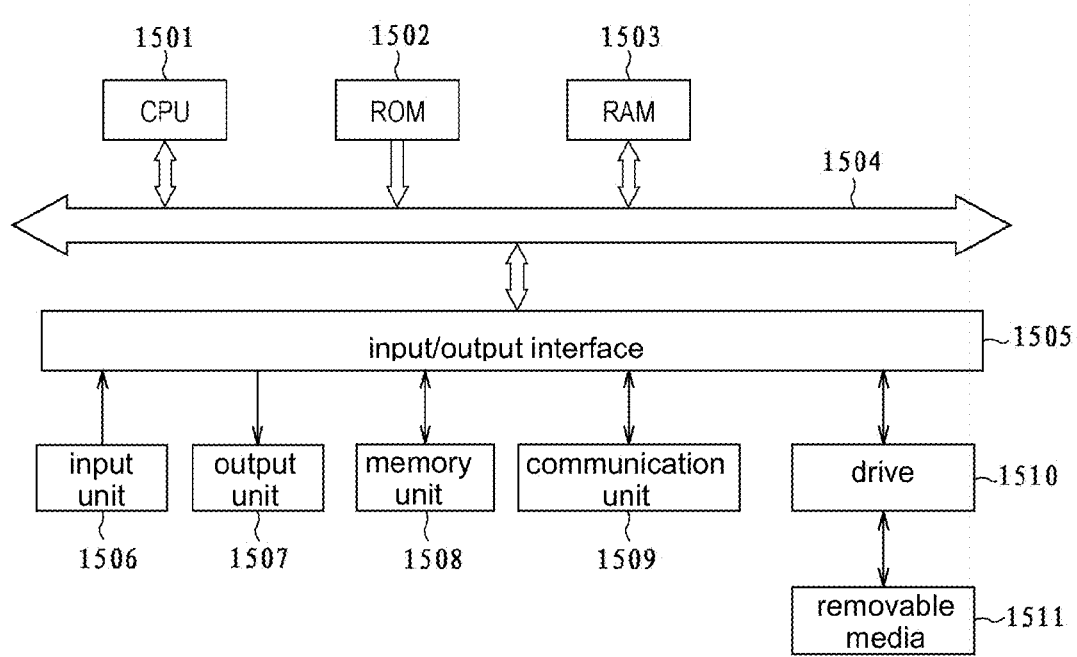
FIG. 10 shows a block diagram of an example of the structure of a computer.

FIG. 10 shows a block diagram of an exemplary computer hardware structure for carrying out the above processes.

A central processing unit (CPU) 1501, read-only memory (ROM) 1502 and random access memory (RAM) 1503 are connected with each other through a bus 1504.

An input/output (I/O) interface 1505 is connected to the bus 1504. Input units 1506 such as a keyboard or mouse and output units 1507 such as a display or a speaker are connected to the I/O interface 1505. In addition, a memory unit 1508 such as a hard disk or non-volatile memory, a communication unit 1509 such as a network interface and a driver 1510 for driving removable media 1511 are connected to the I/O interface 1505.

In the computer configuration described above, the CPU 1501 loads programs stored in the memory unit 1508 to RAM 1503 through the I/O interface 1505 and the bus 1504, and executes the programs to perform the above processes.

The programs executed by the CPU 1501 may be, for example, recorded on the removable media 1511 or may be provided through wired or wireless transmission media (e.g. a LAN, the Internet, or digital broadcasting), and installed in the memory unit 1508.

The programs executed by the computer may be executed according to the order described above, or may be processed whenever necessary (for example, by all).

Although the preferred examples of the present application have been described, a person skilled in the art, once obtaining the basic inventive concept, can make additional variations and modifications to these examples. Therefore, the attached claims are intended to be interpreted as including the preferred examples and all variations and modifications falling into the scope of the present application.

What is claimed is:

1. A method for determining edge lines of a QR code binary image comprising:
   obtaining location information of locating points within the QR code image;
   determining locating lines, on which edges of the QR code locate according to the location information and to distances from the locating points to edges of the QR code;
   detecting pixels adjacent to at least one of the locating lines;
   obtaining a detection line for each one of the detected pixels, the detection line passing through the detected pixel and extending perpendicular to the locating line to an external side of the locating line;
   detecting edge points on the external side of the locating line along the direction of the locating line by
   detecting grayscale values of the pixels on the external side of the locating line along the detection line until a white pixel is detected;
   setting the last black pixel detected before detecting the white pixel as an edge point on the detection line;

in the absence of black pixels on the detection line, detecting two black pixels adjacent to the detection line, obtaining an average value of distances of the two black pixels from the locating line, and setting the average value as a distance between an edge point on the detection line and the locating line; and connecting the edge points on the detection lines to form an edge line of the QR code.

2. The method of claim 1 further comprising:

dividing the image into blocks: dividing the QR code binary image into blocks, selecting blocks including edges of the QR code as boundary blocks, each boundary block including at least two locating points which have fixed distances to edges of the QR code;

in the step of obtaining locating lines, determining a locating line in the boundary block where an edge of the QR code locates, according to location information of each locating point in a boundary block and distances from the locating point to edges of the QR code;

in the step of obtaining edge lines, detecting edge points on the external side of the locating line along the direction of a locating line, connecting these edge points to form an edge line of boundary block, and connecting the edge lines of each boundary block to obtain an edge line of the QR code.

3. The method of claim 2 wherein in the step of dividing the image into blocks, the boundary block is a rectangle, and each boundary block includes four locating points having fixed distances to edges of the QR code.

4. The method of claim 1 wherein in the step of dividing the image into blocks, the central points of detection patterns and/or correction patterns are selected as locating points in a boundary block.

5. The method of claim 1 wherein in the step of obtaining edge points, if there is no black pixel on the detection line and there is only one black pixel adjacent to the detection line, obtaining the distance from the black pixel to the locating line as the distance between an edge point on the detection line to the locating line.

6. A system for determining edge lines of a QR code binary image comprising:

a locating line obtaining unit, for determining locating lines on which edges of the QR code locate according to location information of locating points within the QR code image and according to distances from the locating points to edges of the QR code;

an edge line obtaining unit, for detecting edge points on the external side of at least one of the locating lines along the direction of the locating line, and for connecting these edge points to form an edge line of the QR code, the edge line obtaining unit including a pixel obtaining module, for obtaining all pixels adjacent to a locating line;

a detection line obtaining module, for each pixel, obtaining a detection line passing through the pixel and perpendicular to the locating line, the detection line extending to the external side of the locating line;

an edge point obtaining module, for detecting grayscale values of pixels on the external side of the locating line along the direction of the detection line, until a white pixel is detected, and taking the last black pixel that is detected as an edge point on the detection line, the edge point obtaining module further being configured, if black pixel on the detection line is detected, to find two black pixels adjacent to the detection line, to obtain an average value of distances from the two black pixels to the locating line as the distance between the edge point on the detection line and the locating line.

7. The system of claim 6 further comprising:

an image dividing unit, for dividing the QR code binary image into blocks, and for selecting blocks including edges of the QR code as boundary blocks, each boundary block including at least two locating points which have fixed distances to edges of the QR code;

wherein, in the locating line obtaining unit, a locating line in each boundary block is determined where an edge of the QR code locates, according to location information of each locating point in each boundary block and according to the distances from the locating point to edges of the QR code; and wherein, in the edge line obtaining unit, edge points on the external side of the locating line are detected along the direction of a locating line, the edge points are connected to form an edge line of each boundary block, and the edge lines of each boundary block are connected to obtain the edge line of the QR code.

8. The system of claim 7 wherein in the image dividing unit, the boundary block is a rectangle, and each boundary block includes four locating points.

9. The system of claim 6 wherein in the image dividing unit, the central points of detection patterns and/or correction patterns are selected as locating points in at least one of the boundary blocks.

10. The system of claim 6 wherein the edge point obtaining module is further configured to, if there is no black pixel on the detection line and there is only one black pixel adjacent to the detection line, obtain the distance from the black pixel to the locating line as the distance between an edge point on the detection line to the locating line.

11. A system for determining edge lines of a QR code binary image, comprising:

a processor, wherein the processor is configured to obtain locating lines by determining locating lines on which edges of the QR code locate according to location information of locating points within the QR code image and distances from the locating points to edges of the QR code; and and to obtain edge lines by detecting edge points on external sides of the locating lines along the direction of the locating lines, and to connect these edge points to form the edge lines of the QR code, wherein, in the process of obtaining the edge lines, the processor is further configured to detect pixels adjacent to at least one of the locating lines:

to obtain a detection line: for each pixel, obtain a detection line passing through the pixel and perpendicular to the locating line, the detection line extending to the external side of the locating line; and to obtain edge points: detect grayscale values of pixels on the external side of the locating line along the direction of the detection line, until a white pixel is detected, and take the last black pixel that is detected as an edge point on the detection line, in the process of obtaining edge points, if there is no black pixel on the detection line, the processor is further configured to find two black pixels adjacent to the detection line, to obtain an average value of distances from the two black pixels to the locating line as a distance between the edge point on the detection line and the locating line.

\* \* \* \* \*